United States Patent
Im et al.

(10) Patent No.: US 7,812,824 B2
(45) Date of Patent: Oct. 12, 2010

(54) CONTENTS NAVIGATION METHOD AND CONTENTS NAVIGATION APPARATUS THEREOF

(75) Inventors: Do-hun Im, Seoul (KR); Sun-young Kim, Seoul (KR); Eun-hui Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1127 days.

(21) Appl. No.: 11/483,706

(22) Filed: Jul. 11, 2006

(65) Prior Publication Data

US 2007/0152981 A1 Jul. 5, 2007

(30) Foreign Application Priority Data

Dec. 29, 2005 (KR) .................. 10-2005-0134316

(51) Int. Cl.
*G06F 3/041* (2006.01)
(52) U.S. Cl. .................. 345/173; 345/649; 345/902
(58) Field of Classification Search ......... 345/156–184, 345/902
See application file for complete search history.

(56) References Cited

U.S. PATENT DOCUMENTS

| 6,411,337 | B2 * | 6/2002 | Cove et al. ................. 348/563 |
| 6,483,500 | B1 * | 11/2002 | Choi et al. ................. 345/156 |
| 6,965,376 | B2 * | 11/2005 | Tani et al. ................. 345/173 |
| 2004/0072596 | A1 | 4/2004 | Yamamoto et al. |
| 2004/0252109 | A1 | 12/2004 | Trent et al. |
| 2004/0257341 | A1 * | 12/2004 | Bear et al. ................. 345/157 |
| 2005/0184968 | A1 * | 8/2005 | Uchida et al. ............... 345/173 |

FOREIGN PATENT DOCUMENTS

| JP | 11-351898 A | 12/1999 |
| JP | 2001-184158 A | 7/2001 |
| JP | 2003-256101 A | 9/2003 |
| JP | 2003-256117 A | 9/2003 |
| JP | 2003-330587 A | 11/2003 |
| JP | 2004-70654 A | 3/2004 |
| JP | 2004-326402 A | 11/2004 |
| JP | 2005-522797 A | 12/2004 |
| KR | 10-2005-0021925 A | 3/2005 |
| KR | 10-2005-0058582 A | 6/2005 |
| KR | 2005-0050803 A | 6/2005 |
| WO | 01/27733 A1 | 4/2001 |

* cited by examiner

*Primary Examiner*—David L Lewis
(74) *Attorney, Agent, or Firm*—Sughrue Mion, PLLC

(57) ABSTRACT

A contents navigation method includes: sensing a touch; generating sensing information based on the sensed touch; and determining, by using the sensing information, whether the sensed touch is a continuous movement, by sensing an electrical sensor, or a pressing, by sensing a mechanical button. If it is determined that the sensed touch is a continuous movement, a menu display is rotated according to the continuous movement of the electrical sensor based on the sensing information. If it is determined that the sensed touch is a pressing, the menu display is rotated according to the pressing of the mechanical button. A contents navigation apparatus includes: a graphic user interface (GUI) part to generate the menu display; an input sensing part to sense a touch and to generate sensing information based on the sensed touch; and a control part to control the GUI part.

22 Claims, 7 Drawing Sheets

US 7,812,824 B2

CONTENTS NAVIGATION METHOD AND CONTENTS NAVIGATION APPARATUS THEREOF

CROSS-REFERENCE TO RELATED APPLICATIONS

This application claims priority from Korean Patent Application No. 10-2005-0134316 filed on Dec. 29, 2005, the entire content of which is incorporated herein by reference.

BACKGROUND OF THE INVENTION

1. Field of the Invention

Apparatuses and methods consistent with the present invention relate to contents navigation, more particularly, to contents navigation that combines a wheel navigation scheme and a four-direction navigation scheme based on a generally circular motif to provide a simple navigation means and a user interface that can be easily recognized.

2. Description of the Related Art

Recently, various contents such as digital contents and mobile contents have been provided through wired and wireless communication networks. For example, a digital television (TV) provides digital contents such as movies, music, games, and digital broadcasting through wired and/or wireless communication networks, and a mobile communication terminal device also provides mobile contents such as digital broadcasting, karaoke, and games.

Devices to provide the various contents include digital TVs, set-top boxes, mobile communication terminal devices, MP3 players, portable multimedia players (PMPs), and personal digital assistants (PDAs). The devices have a contents navigation means and provide a user interface (UI) and a contents navigation method for a user to retrieve various contents.

FIG. 1A is a view illustrating an example of a conventional contents navigation method. Referring to FIG. 1A, a conventional contents navigation apparatus provides a graphical user interface (GUI) 10 of a cross-media bar scheme and a physical user interface (PUI) 15 of a four-direction scheme. In detail, up, down, left, and right keys are operated to move contents menus up, down, left, and/or right, and other keys (except for the up, down, left, and right keys) are operated to select and cancel contents. This interface has a menu structure in which the whole contents can be easily viewed, and a user can easily learn this structure because it uses a four-direction key.

However, as the number of the contents increases, the number of operations of the four-direction key increases. Accordingly, as sub-menus are further developed, the number of key operations to return to a main menu also increases so that it causes a user more inconvenience.

FIG. 1B is a view illustrating another example of a conventional contents navigation method. Referring to FIG. 1B, another conventional contents navigation apparatus provides a GUI 100 of a wheel-based hierarchical scheme and a PUI 150 of a wheel scheme. In detail, a wheel is operated up, down, left, and/or right to move contents menu to up, down, left, and/or right, and other keys (except for the wheel) are operated to select and cancel contents. If this interface is applied, it is convenient to select a plurality of contents menus of one-dimensional structure.

However, it is difficult to perform smaller operations and recognize the present location, because the menu structure is deeper. Accordingly, it is difficult to search the main menu for a sub-menu and complicated to return to the main menu.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. An exemplary embodiment of the present invention provides a contents navigation method that can speedily search contents and provides a GUI which is consistent and easy to understand, and a contents navigation apparatus thereof.

Another exemplary embodiment of the present invention provides a contents navigation method with a PUI that is simple, easy to learn, and easy to operate.

According to one aspect of the present invention, there is provided a contents navigation method including operations of sensing a touch and generating sensing information on the sensed touch, determining whether the sensed touch is a continuous movement by sensing an electrical sensor or a pressing by a mechanical button using the sensing information. If it is determined that the sensed touch is a continuous movement by the electrical sensor, rotating a menu display according to the movement of the electrical sensor based on the sensing information. If it is determined that the sensed touch is a pressing by the mechanical button, rotating the menu display according to the pressing of the mechanical button.

The sensing information may include the kind of touch, the number of the electrical sensors touched, a movement direction of the touch, and/or a movement speed of the touch.

The menu display may be arranged in one of a generally circular form rotating left and right and a generally circular form rotating up and down.

The operation of rotating the menu display according to the movement of the electrical sensor may rotate the menu display in view of the number of the touched electrical sensor, the movement direction of the touch, and/or the movement speed of the touch.

The operation of rotating the menu display according to the movement of the electrical sensor may rotate a menu display in a clockwise direction if the touch is moved in a clockwise direction, and may rotate the menu display in a counterclockwise direction if the touch is moved in a counterclockwise direction. Here, the menu display is arranged in a generally circular form, rotating left and right.

The operation of rotating the menu display according to the movement of the electrical sensor may rotate a menu display up if the touch is moved in a clockwise direction, and may rotate the menu display down if the touch is moved in a counterclockwise direction. Here, the menu display is arranged in a generally circular form, rotating up and down.

The operation of rotating the menu display according to the movement of the electrical sensor may not rotate the menu display if the number of the electrical sensors touched is less than a certain number.

The operation of rotating the menu display according to the movement of the electrical sensor may not rotate the menu display if the movement direction of the touch and/or the movement speed of the touch do not exist, that is, if the touch is sensed but movement of the touch is not sensed.

The operation of rotating the menu display according to the movement of the electrical sensor may move the menu display by skipping menus of the menu display according to a preset reference speed, and control movement speeds of menus of the menu display to be identical irrespective of the movement speed of the touch.

The operation of rotating the menu display according to the pressing of the mechanical button may move the menu display one of up, down, left, and right according to one of the up, down, left, and right buttons of the mechanical button.

According to one aspect of the present invention, there is provided a contents navigation apparatus including a GUI part to generate a menu display, an input sensing part to sense a touch and to generate sensing information on the sensed touch, a control part to control the GUI part to determine whether the sensed touch is a continuous movement by a sensing of an electrical sensor or a pressing by a mechanical button using the sensing information. If it is determined that the sensed touch is a continuous movement by the electrical sensor, to rotate the menu display according to the movement of the electrical sensor based on the sensing information. If it is determined that the sensed touch is a pressing by the mechanical button, to rotate the menu display according to the pressing of the mechanical button.

The apparatus may further include a key input part including a circular motif navigation key to combine a four-direction scheme and a touch-recognition-wheel scheme. The circular motif navigation key may include the mechanical button including four buttons of up, down, left, and right to implement the four-direction scheme, and a certain number of the electrical sensors arranged in a generally circular form and apart from one another at a predetermined distance to implement the touch-recognition-wheel scheme.

The key input part may further include a selection key formed on a center of the circular motif navigation key, a back/cancel key formed separately from the circular motif navigation key to input back/cancel commands, and a home key to input a command to return to a main menu, that is, a home.

The sensing information may include the kind of touch, the number of the electrical sensors touched, a movement direction of the touch, and/or a movement speed of the touch.

The GUI part may arrange the menu display in one of a generally circular form rotating left and right and a generally circular form rotating up and down.

The control part may rotate the menu display in view of the number of the electrical sensors touched, the movement direction of the touch, and/or the movement speed of the touch.

The control part may rotate a menu display in a clockwise direction if the touch is moved in a clockwise direction according to the movement of the electrical sensor, and rotate the menu display in a counterclockwise direction if the touch is moved in a counterclockwise direction. Here, the menu display is arranged in a generally circular form that rotates left and right.

The control part may rotate a menu display up if the touch is moved in a clockwise direction according to the movement of the electrical sensor, and rotate the menu display down if the touch is moved in a counterclockwise direction. Here, the menu display is arranged in a generally circular form that rotates up and down.

The control part may not rotate the menu display if the number of electrical sensors touched is less than a certain number.

The control part may not rotate the menu display if the movement direction of the touch and/or the movement speed of the touch do not exist according to the movement of the electrical sensor, that is, if the touch is sensed but the movement of the touch is not sensed.

The control part may move the menu display by skipping menus of the menu display according to a preset reference speed, and control movement speeds of menus of the menu display to be identical irrespective of the movement speed of the touch.

The control part may move the menu display to one of up, down, left, and right according to one of the up, down, left, and right buttons of the mechanical button.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS

Figure 1A:
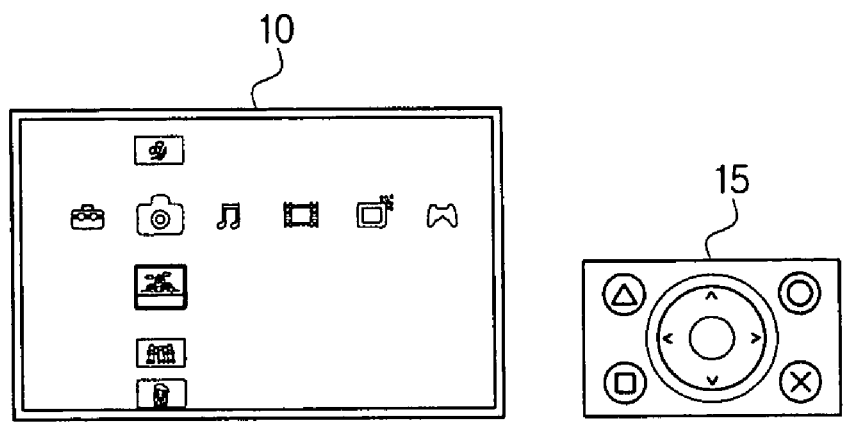
FIG. 1A is a view illustrating an example of a conventional contents navigation method.
Figure 1B:
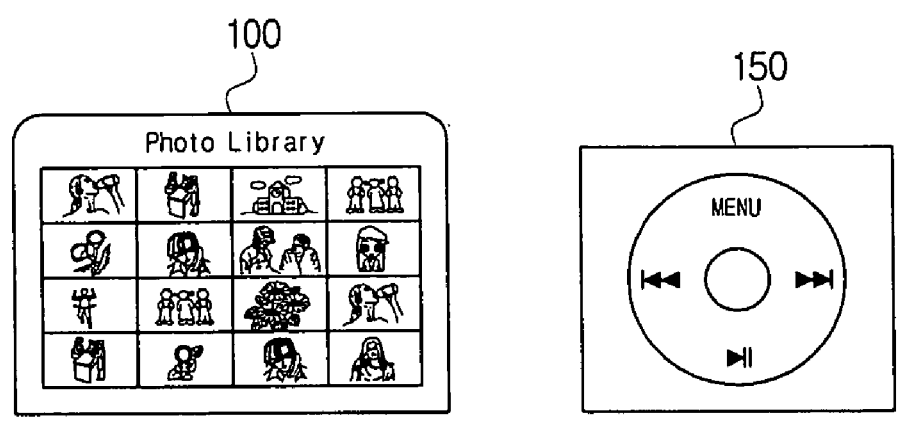
FIG. 1B is a view illustrating another example of a conventional contents navigation method.

Exemplary embodiments of the present invention will be described in detail with reference to the accompanying drawings. In the drawings, the same elements are denoted by the same reference numerals throughout the drawings. In the following, detailed descriptions of known functions and configurations incorporated herein have been omitted for conciseness and clarity.

Figure 2:
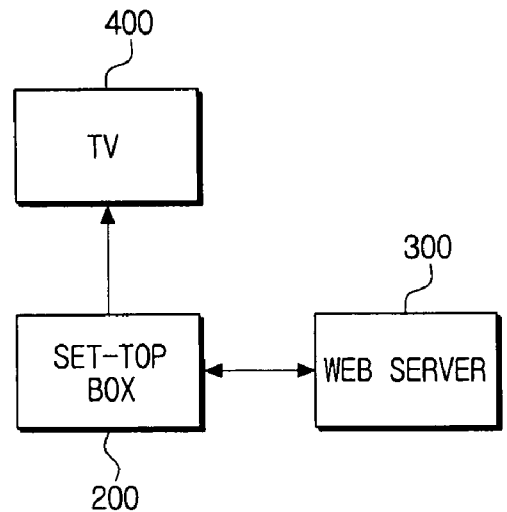
FIG. 2 is a view illustrating a home network system including a contents navigation apparatus according to an exemplary embodiment of the present invention.

FIG. 2 is a view illustrating a home network system including a contents navigation apparatus according to an exemplary embodiment of the present invention.

Referring to FIG. 2, a home network system comprises a set-top box 200, a web server 300, and TV 400.

The set-top box 200 provides various contents and is an example of a contents navigation apparatus providing contents navigation menus and contents navigation means to search the contents.

In detail, the set-top box 200 comprises a contents navigation means that is simple, easy to learn, and easy to operate. The set-top box 200 generates contents navigation menus that are consistent and easily understood, so that a user can easily recognize various contents such as movies, music, games, karaoke, and digital broadcasting, which are provided through the web server 300. Additionally, the set-top box 200 displays the generated contents navigation menus on the TV 400 and provides the contents selected by a user through the TV 400 using the contents navigation means.

Figure 3:
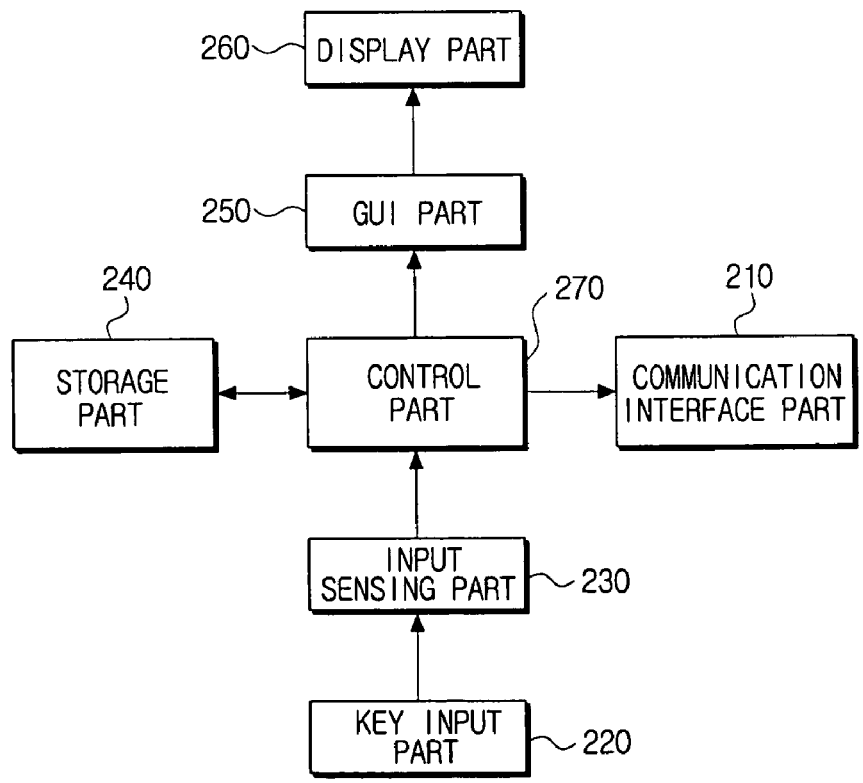
FIG. 3 is a block diagram of a contents navigation apparatus according to an exemplary embodiment of the present invention.

FIG. 3 is a block diagram of a contents navigation apparatus according to an exemplary embodiment of the present invention.

Referring to FIG. 3, the contents navigation apparatus comprises a communication interface part 210, a key input part 220, an input sensing part 230, a storage part 240, a GUI part 250, a display part 260, and a control part 270.

The communication interface part 210 provides an interface to communicate data with the web server 300 or a wireless base station through wired and/or wireless communications. In detail, the communication interface part 210 receives contents information and contents from the web server 300 or the wireless base station.

The key input part 220 is an input means of a user command on contents navigation and provides a user with a contents navigation PUI. In detail, the key input part 220 has a circular motif navigation key that combines a four-direction scheme and a touch-recognition-wheel scheme. The touch-recognition-wheel scheme refers to a rotation scheme by recognition of a touch instead of mechanical rotation.

The key input part 220 comprises a selection key at a center of the circular motif navigation key, a back/cancel key separated from the circular motif navigation key to input back/cancel commands, and a home key to input a command to return to a main menu, that is, a home. The key input part 220 may be a keypad that is integrally formed with a body of a contents navigation apparatus or a remote controller that is formed separately from the body of the contents navigation apparatus. A detailed description of the key input part 220 will be explained with reference to FIGS. 4A and 4B.

The input sensing part 230 senses an input of the key input part 220. In detail, the input sensing part 230 senses whether the circular motif navigation key input by the touch of the user is made by the four-direction scheme or by the touch-recognition-wheel scheme. The input sensing part 230 senses a touch movement direction and a touch movement speed of the touch-recognition-wheel scheme. Additionally, the input sensing part 230 senses inputs of the selection key, the back/cancel key, and the home key.

The contents navigation GUI, that is, data to generate contents menus, is stored in the storage part 240. Data to control a movement of the contents menu sensed by the input sensing part 230 is also stored into the storage part 240.

The GUI part 250 provides a user with the contents navigation GUI. In detail, the GUI part 250 generates a GUI, that is, contents menu, corresponding to a user's command under control of the control part 270, which will be explained later. On the display part 260, the contents menu generated by the GUI part 250 is displayed.

The control part 270 reads the user's command input by the key input part 220 to control the GUI part 250 to generate the GUI corresponding to the user's command. In detail, the control part 270 controls the GUI part 250 to generate and move the contents menu based on the kind of input key, the touch movement direction, and the touch movement speed of the touch-recognition-wheel scheme sensed by the input sensing part 230.

Figure 4A:
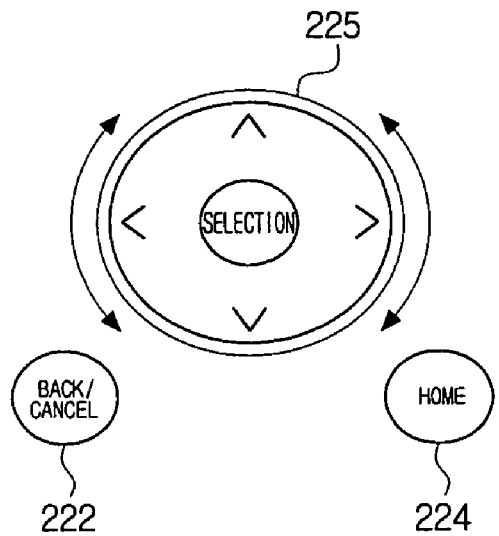
FIGS. 4A and 4B are views illustrating a key input part of a contents navigation apparatus according to an exemplary embodiment of the present invention.
Figure 4B:
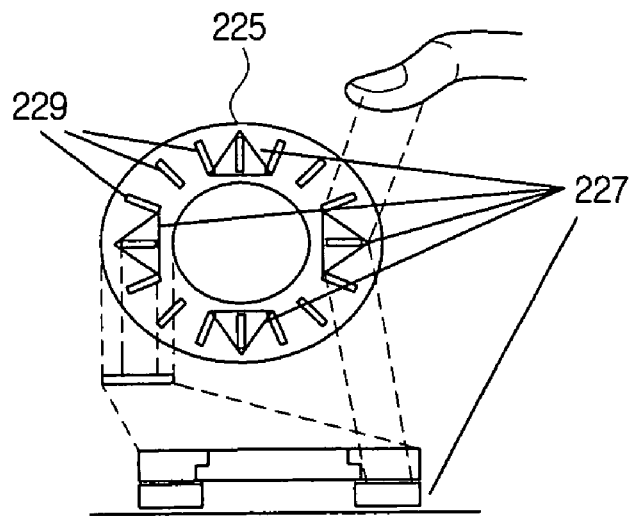

FIGS. 4A and 4B are views illustrating the key input part of the contents navigation apparatus according to an exemplary embodiment of the present invention.

Referring to FIG. 4A, the key input part 220 comprises a back/cancel key 222, a home key 224, a circular motif navigation key 225, and a selection key on a center of the circular motif navigation key 225.

The back/cancel key 222 is to input a command to return to a previous menu of the contents menu and a command to cancel the selection of the contents menu. The home key 224 is to input a command to return from a sub-menu to a main menu, that is, to a home. The circular motif navigation key 225 combines the four-direction scheme and the touch-recognition-wheel scheme to input a command to move the contents menu up, down, left, or right.

Referring to FIG. 4B, in detail, the circular motif navigation key 225 comprises a mechanical button 227 to implement the four-direction scheme and an electrical sensor 229 to implement the touch-recognition-wheel scheme.

The mechanical button 227 comprises four directional buttons for up, down, left, and right, and receives a command to move the contents menu up, down, left, or right by a press. The electrical sensor 229 may comprise, for example, twelve or sixteen sensors that are arranged in a generally circular form and apart from one another at a predetermined distance. The electrical sensor 229 receives a command to rotate the contents menu in a clockwise direction and a counterclockwise direction by recognition of touch, namely, sensing of touch.

In the present embodiment, the electrical sensor 229 comprises sixteen sensors. However, this should not be considered as limiting. The electrical sensor 229 may comprise more or less than sixteen sensors.

FIGS. 5A through 5F are views for explaining a contents navigation method of a contents navigation apparatus according to an exemplary embodiment of the present invention.

Figure 5A:
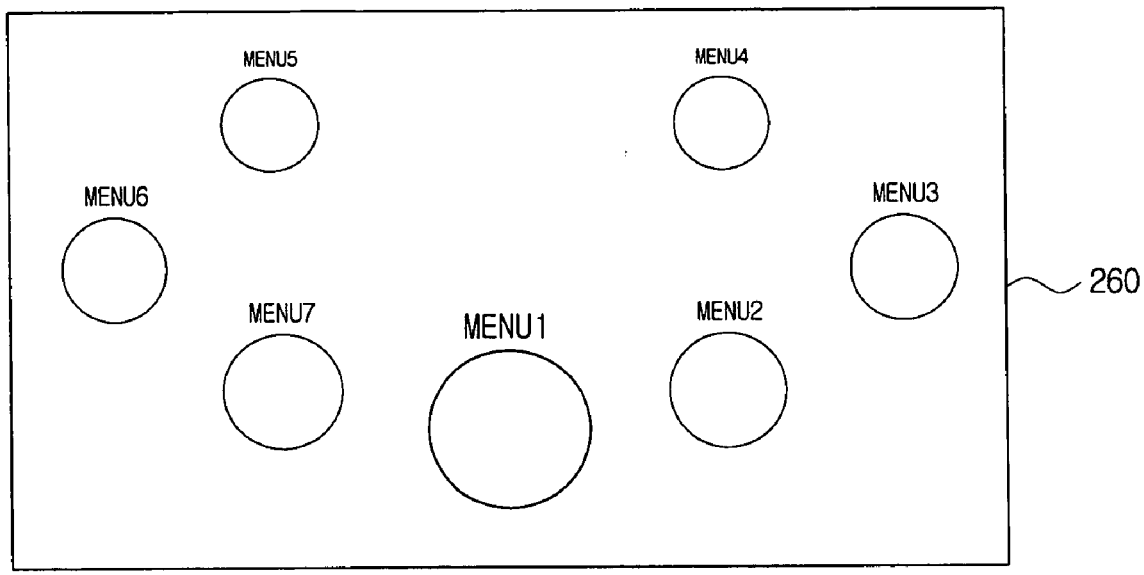
FIGS. 5A through 5F are views for explaining a contents navigation method of a contents navigation apparatus according to an exemplary embodiment of the present invention.

As shown in FIG. 5A, an initial contents menu display motivated by a circle is displayed on the display part 260. In detail, the initial contents menu display is arranged in a generally circular form in which each contents menu, namely, menu 1 through menu 7, rotates left and right and a focused contents menu, in this case, menu 1, is located in a middle of the display part 260. At this time, menu 2 and menu 7 (next to menu 1) are generated smaller than menu 1. Menu 3 and menu 6 can be, for example, generated smaller than menu 2 and menu 7, and menu 4 and menu 5 can be generated smaller than menu 3 and menu 6. In this way, each contents menu of menu 1 through menu 7 is arranged in a generally circular form.

For example, menu 1 may be movies, menu 2 may be music, menu 3 may be games, and menu 4 may be karaoke.

Figure 5B:
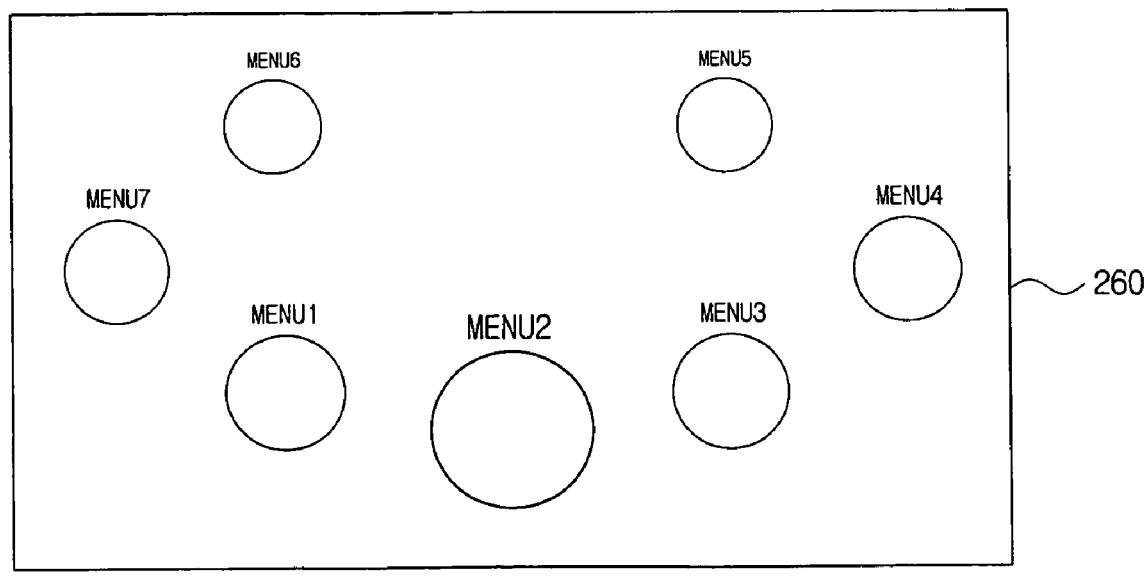

If the circular motif navigation key 225 of the key input part 220 is touched in a clockwise direction, each contents menu, namely, menu 1 through menu 7, rotates and moves in a clockwise direction as shown in FIG. 5B. In other words, if the clockwise direction touch of the circular motif navigation key 225 is sensed by the input sensing part 230, the control part 270 controls the GUI part 250 to rotate each contents menu 1 through 7 in a clockwise direction corresponding to the clockwise direction touch. Accordingly, menu 2 would be located in the middle, for example. This also could be implemented by pressing the left mechanical button of the circular motif navigation key 225. Alternatively, for example, the right mechanical button could be used for this purpose.

Conversely, if the circular motif navigation key 225 of the key input part 220 is touched in a counterclockwise direction, each contents menu 1 through 7 rotates and moves in a counterclockwise direction. Accordingly, menu 7 would be located in the middle, for example. This also could be implemented by pressing the right mechanical button of the circular motif navigation key 225. Alternatively, for example, the left mechanical button could be used for this purpose.

When using, for example, the clockwise or counterclockwise direction touch or the left or right mechanical buttons as described above, commands by the up and down mechanical buttons of the circular motif navigation key 225 are not used.

Figure 5C:
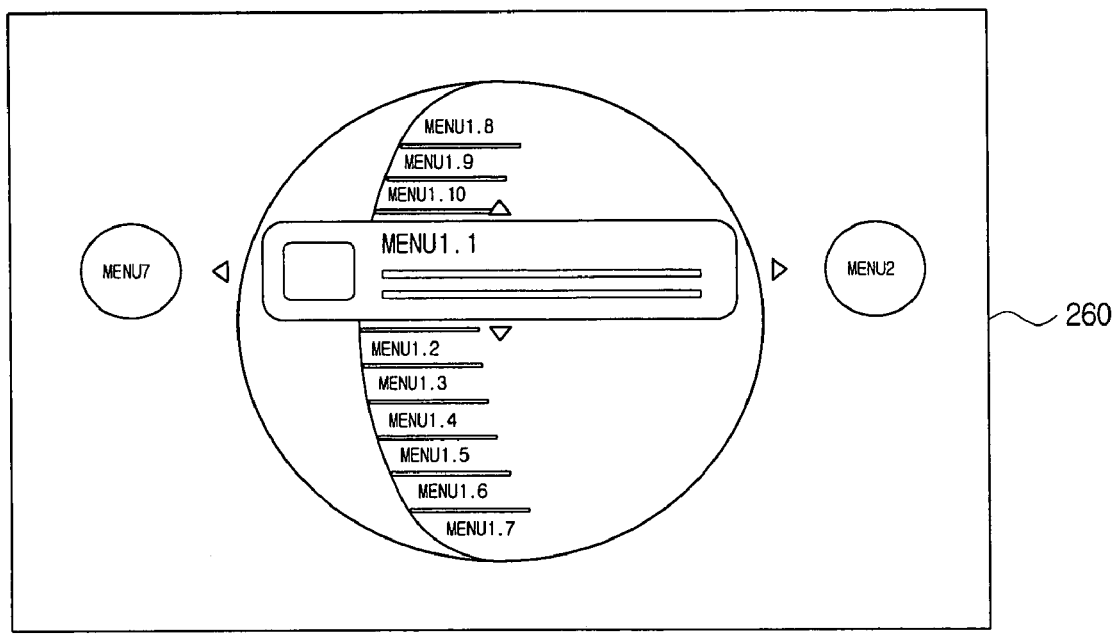

FIG. 5C is a sub-menu list display of menu 1 when a selection command is input using the selection key as menu 1 is focused. The sub-menu list display is arranged in a generally circular form in which each sub-menu list, namely, menu 1.1 through menu 1.10, rotates up and down and a focused sub-menu, namely, menu 1.1 displays a preview screen and Meta data information of contents. At left and right of the sub-menu list, contents menus, namely, menu 2 and menu 7, are displayed. For example, if menu 1 is movies, menu 1.1 may display a preview screen of one or more movies and the associated movie information.

If the circular motif navigation key 225 of the key input part 220 is touched in a clockwise direction, each sub-menu list, namely, menu 1.1 through menu 1.10, rotates and moves up. In other words, if the clockwise direction touch of the circular motif navigation key 225 is sensed by the input sensing part 230, the control part 270 controls the GUI part 250 to rotate up each sub-menu list, namely, menu 1.1 through menu 1.10, corresponding to the clockwise direction touch. Accordingly, menu 1.2 is focused. This can be implemented also by when the up mechanical button of the circular motif navigation key 225 is pressed. Alternatively, for example, the down mechanical button could be used for this purpose.

Conversely, if the circular motif navigation key 225 of the key input part 220 is touched in a counterclockwise direction, each sub-menu list, namely, menu 1.1 through menu 1.10, rotates and moves down. Accordingly, menu 1.10 would be located in the middle, for example. This can be implemented also by when the down mechanical button of the circular motif navigation key 225 is rotated. Alternatively, for example, the up mechanical button could be used for this purpose.

Figure 5D:
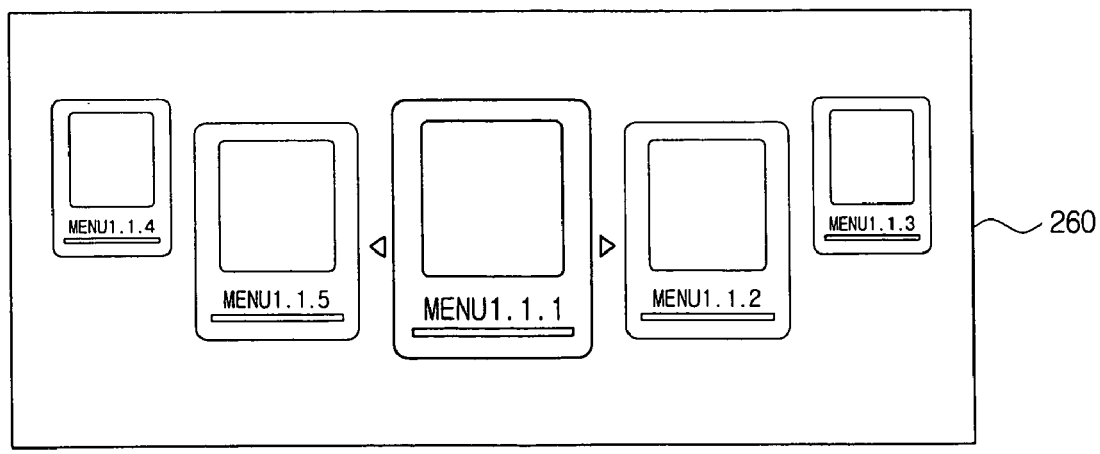
Figure 5E:
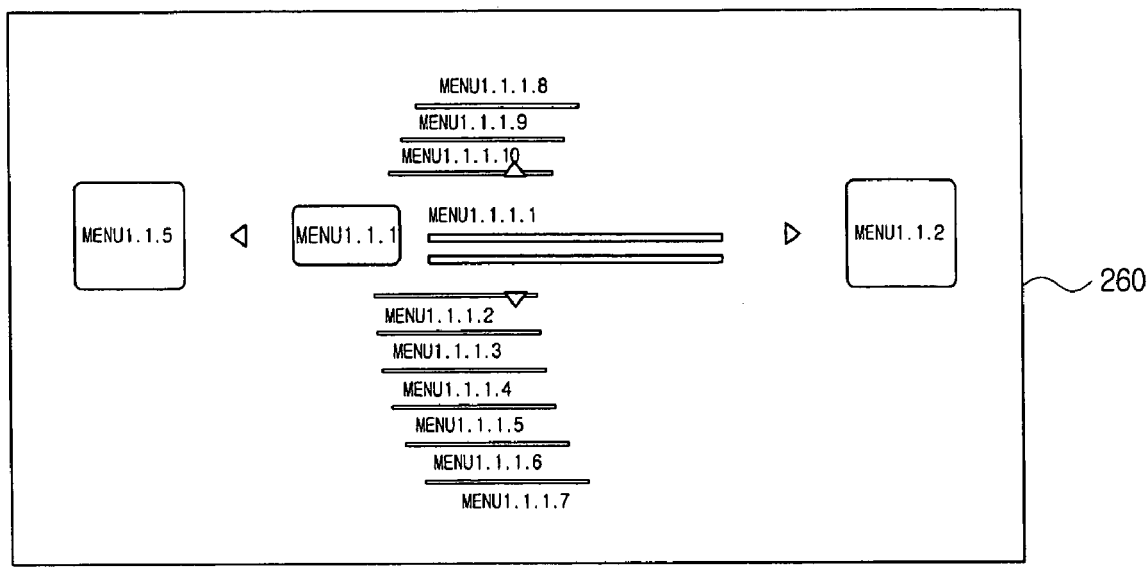

FIG. 5D is a sub-menu display of menu 1.1 when a selection command is input using the selection key as menu 1.1 is focused, and FIG. 5E is a sub-menu list screen of menu 1.1.1 when a selection command is input using the selection key as sub-menu 1.1.1 of menu 1.1 is focused. As shown, the menu display is arranged in a generally circular form so that the kinds of contents menus on the menu display can be easily recognized and the movement of menus on the screen can be also easily recognized. Additionally, if an upper hierarchical menu display is arranged with generally circular menus rotating left and right, the lower hierarchical menu display is arranged with generally circular menus rotating up and down so that the hierarchical movement of the menu display can be recognized.

On the menu display arranged in a generally circular form rotating left and right, commands by the up and down mechanical buttons are not used. Therefore, menus can be easily moved, reducing inconvenience of the user. Additionally, if menus cannot be displayed on one screen due to the large number of menus, lists that cannot be seen on one screen are omitted and/or hidden so that the menu display can be more easily recognized.

Figure 5F:
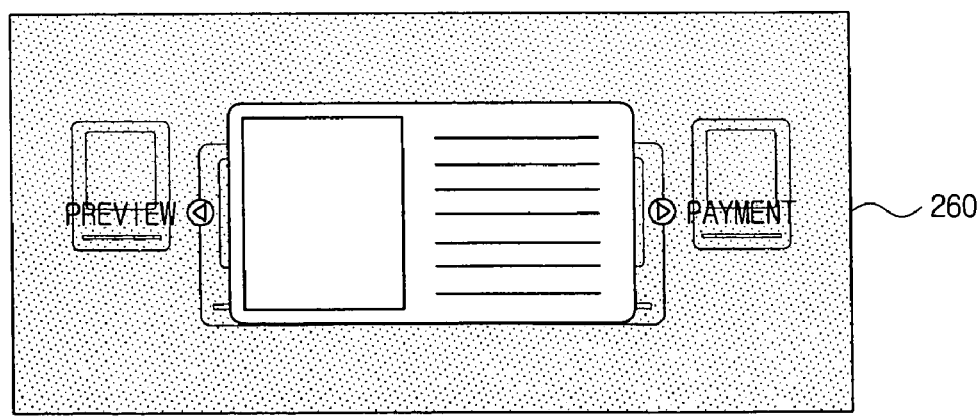

FIG. 5F illustrates an example of a menu display when a selection command is input using a selection key on a final contents menu. For example, if a movie menu is selected, a preview screen and detailed information about the movie appear, and a preview menu and a payment menu also appear. Here, the preview menu or the payment menu can be selected by the left and right mechanical buttons of the circular motif navigation key 225. The navigation menu on this screen may correspond to all of the directions of the four-direction mechanical button 227 and, accordingly, the navigation menu can be arranged up and down or left and right.

At this time, if the home key 224 of the key input part 220 is pressed in any menu display shown in FIGS. 5B through 5F, the menu display is moved to the initial contents menu display shown in FIG. 5A. Accordingly, it is not necessary to take several steps to return to the initial contents menu display, and convenience of the user increases.

Figure 6:
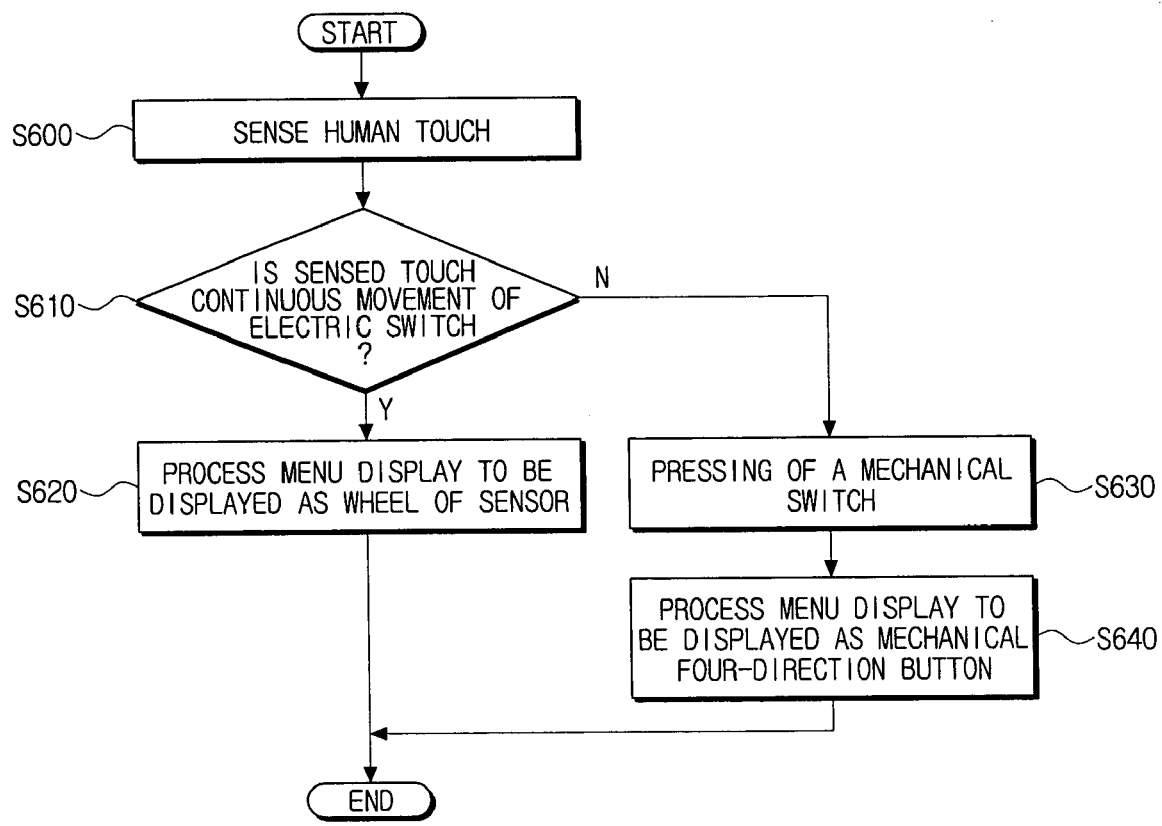
FIG. 6 is a flowchart of a contents navigation method of a contents navigation apparatus according to an exemplary embodiment of the present invention.

FIG. 6 is a flowchart for explaining a contents navigation method of a contents navigation apparatus according to an exemplary embodiment of the present invention.

Referring to FIG. 6, the input sensing part 230 senses a touch, for example, a human body touch by a user (S600). At this time, the input sensing part 230 senses the human body touch of pressing the mechanical button 227 of the circular motif navigation key 225 of the key input part 220, or senses pressing of the electrical sensor 229. The input sensing part 230 transmits the sensing information to the control part 270. The sensing information includes the kind of sensed input key and, if the kind of sensed input key is the electrical sensor 229, the sensing information further includes the number of sensors touched, the touch movement direction, and the touch movement speed.

The control part 270 determines if the touch is a continuous movement of an electrical switch, namely; the electrical sensor 229 based on the sensing information of the input sensing part 230 (S610).

If it is determined that the touch is the continuous movement of the electrical sensor 229 (S610-Y), the control part 270 processes the menu display to be displayed as a wheel of a sensor (S620). In detail, the control part 270 controls the menu display to be rotated in view of the touch movement direction and the touch movement speed. At this time, if the number of sensors touched included in the sensing information is two or three, the control part 270 controls the GUI part 250 not to rotate the menu display. This is because the arrangement interval of the electrical sensors 229 and the typical size of users' fingers are considered. Additionally, if the touch movement direction and the touch movement speed are not included in the sensing information, that is, a touch is sensed but a touch movement is not sensed, the control part 270 controls the menu display not to be rotated. This is to reduce confusion between processing of the mechanical button 227 and the electrical sensor 229.

The control part 270 controls the menu display to be rotated based on a preset touch movement reference speed. In detail, if the touch movement speed included in the sensing information is equal to or greater than the preset reference speed, the control part 270 controls the screen to be moved by skipping the menus by two or three according to the preset reference speed. For example, it is assumed that the reference speed is preset as follows: if the electrical sensor 229 is touched at a speed of 2 cm/s, one menu rotates and moves; if the electrical sensor 229 is touched at a speed of 3 cm/s, two menus rotate and move; and if the electrical sensor 229 is touched at speed of 4 cm/s, three menus rotate and move. If the touch movement speed is sensed as 4 cm/s by the input sensing part 230, the control part 270 skips two menus and controls the third menu to be located in the middle.

At this time, the control part 270 sets a limit to the touch movement reference speed so that a user can recognize the menu movement of the screen even when the sensed touch movement speed is too fast. Additionally, the control part 270 can control the speeds of menu movement on the screen to be identical irrespective of the speed of the sensed touch movement. Accordingly, a user can easily recognize the menu movement, and confusion caused by menu movement can be reduced.

In the operation S610, if it is determined that the touch is not continuous movement of the electrical sensor 229 (S610-N), the control part 270 determines that the touch is a pressing of a mechanical switch, that is, the mechanical button 227 (S630).

If it is determined that the mechanical button 227 is pressed, the control part 270 processes the menu display to be displayed as the mechanical four-direction button (S640). In detail, the control part 270 controls the menu to move to one of up, down, left, and right according to one of up, down, left, and right buttons of the mechanical button 227 based on the kind of input key included in the sensing information.

As described above, the embodiments of the present invention simultaneously provide the touch-recognition-wheel scheme and the four-direction scheme so that a user can familiarly operate the contents navigation apparatus and the four-direction button can supplement the touch-recognition-wheel scheme for smaller operations.

Even when the number of contents increases, speedy browsing can be performed according to embodiments of the present invention. Additionally, the contents menu display of the circular motif is provided so that individual and hierarchical movements of menu can be easily recognized.

Furthermore, a simplified contents menu structure and an easily operated contents navigation means are provided so that anyone can easily enjoy the digital contents.

While the invention has been shown and described with reference to certain embodiments thereof, it will be understood by those skilled in the art that various changes in form and details may be made therein without departing from the spirit and scope of the invention as defined by the following claims.

What is claimed is:

1. A contents navigation method, comprising:
    sensing a touch;
    generating sensing information based on the sensed touch;
    determining, by using the sensing information, whether the sensed touch is a continuous movement, by sensing an electrical sensor, or a pressing, by sensing a mechanical button;
    if it is determined that the sensed touch is a continuous movement, rotating a menu display according to the continuous movement of the electrical sensor based on the sensing information; and
    if it is determined that the sensed touch is a pressing, rotating the menu display according to the pressing of the mechanical button.

2. The method of claim 1, wherein the sensing information comprises at least one of:
    a kind of the touch;
    a number of sensors of the electrical sensor that are touched;
    a movement direction of the touch; and
    a movement speed of the touch.

3. The method of claim 1, wherein the menu display is arranged in one of:
    a generally circular form that rotates left and right; and
    a generally circular form that rotates up and down.

4. The method of claim 1, wherein the menu display is rotated according to the continuous movement of the electrical sensor based on a number of sensors of the electrical sensor that are touched, a movement direction of the touch, and a movement speed of the touch.

5. The method of claim 4, wherein the menu display is rotated in a clockwise direction if the movement direction of the touch is clockwise,
    wherein the menu display is rotated in a counterclockwise direction if the movement direction of the touch is counterclockwise, and
    wherein the menu display is arranged in a generally circular form that rotates left and right.

6. The method of claim 4, wherein the menu display is rotated up if the movement direction of the touch is clockwise,
    wherein the menu display is rotated down if the movement direction of the touch is counterclockwise, and
    wherein the menu display is arranged in a generally circular form that rotates up and down.

7. The method of claim 4, wherein the menu display is not rotated if the number of sensors of the electrical sensor that are touched is less than a predetermined number.

8. The method of claim 4, wherein the menu display is not rotated if the movement direction of the touch is not sensed or the movement speed of the touch is not sensed.

9. The method of claim 4, wherein the menu display skips menus of the menu display according to a preset reference speed, and
    wherein the menu display controls movement speeds of the menus to be identical irrespective of the movement speed of the touch.

10. The method of claim 1, wherein pressing the mechanical button moves the menu display one of up, down, left, and right according to one of up, down, left, and right buttons of the mechanical button.

11. A contents navigation apparatus, comprising:
    a graphic user interface (GUI) part which generates a menu display;
    an input sensing part which senses a touch and to generate sensing information based on the sensed touch; and
    a control part which controls the GUI part to determine, using the sensing information, whether the sensed touch is a continuous movement, by sensing an electrical sensor, or a pressing, by sensing a mechanical button;
    wherein if it is determined that the sensed touch is a continuous movement, then the menu display is rotated according to the continuous movement of the electrical sensor based on the sensing information, and
    wherein if it is determined that the sensed touch is a pressing, then the menu display is rotated according to the pressing of the mechanical button.

12. The apparatus of claim 11, wherein further comprising:
    a key input part comprising a circular motif navigation key that combines a four-direction scheme and a touch-recognition-wheel scheme;
    wherein the circular motive navigation key comprises:
    a plurality of electrical sensors; and
    the mechanical button;
    wherein the plurality of electrical sensors are arranged in a generally circular form, apart from one another at a predetermined distance, to implement the touch-recognition-wheel scheme, and
    wherein the mechanical button comprises four buttons of up, down, left, and right to implement the four-direction scheme.

13. The apparatus of claim 12, wherein the key input part further comprises:
    a selection key formed on a center of the circular motif navigation key;
    a back or cancel key formed separately from the circular motif navigation key to input back or cancel commands; and
    a home key which inputs a command to return to a main menu.

14. The apparatus of claim 11, wherein the sensing information comprises at least one of:
    a kind of the touch;
    a number of sensors of the electrical sensor that are touched;

a movement direction of the touch; and a movement speed of the touch.

15. The apparatus of claim 11, wherein the GUI part arranges the menu display in one of:

a generally circular form that rotates left and right; and a generally circular form that rotates up and down.

16. The apparatus of claim 11, wherein the control part rotates the menu display based on a number of sensors of the electrical sensor that are touched, a movement direction of the touch, and a movement speed of the touch.

17. The apparatus of claim 16, wherein the control part rotates the menu display in a clockwise direction if the movement direction of the touch is clockwise, wherein the control part rotates the menu display in a counterclockwise direction if the movement direction of the touch is counterclockwise, and wherein the menu display is arranged in a generally circular form that rotates left and right.

18. The apparatus of claim 16, wherein the control part rotates the menu display up if the movement direction of the touch is clockwise, wherein the control part rotates the menu display down if the movement direction of the touch is counterclockwise, and wherein the menu display is arranged in a generally circular form that rotates up and down.

19. The apparatus of claim 16, wherein the control part does not rotate the menu display if the number of sensors of the electrical sensor that are touched is less than a predetermined number.

20. The apparatus of claim 16, wherein the control part does not rotate the menu display if the movement direction of the touch is not sensed or the movement speed of the touch is not sensed.

21. The apparatus of claim 16, wherein the control part skips menus of the menu display according to a preset reference speed, and wherein the control part controls movement speeds of the menus to be identical irrespective of the movement speed of the touch.

22. The apparatus of claim 11, wherein the control part moves the menu display one of up, down, left, and right according to one of up, down, left, and right buttons of the mechanical button.

* * * * *